US012761479B2

(12) United States Patent
Volkov

(10) Patent No.: US 12,761,479 B2
(45) Date of Patent: Oct. 13, 2026

(54) OPTICAL SYSTEM WITH CYLINDRICAL WAVEGUIDE

(71) Applicant: TruLife Optics Ltd., London (GB)

(72) Inventor: Andrii Volkov, London (GB)

(73) Assignee: TRULIFE OPTICS LIMITED, London (GB)

( * ) Notice: Subject to any disclaimer, the term of this patent is extended or adjusted under 35 U.S.C. 154(b) by 452 days.

(21) Appl. No.: 18/245,910

(22) PCT Filed: Sep. 17, 2021

(86) PCT No.: PCT/GB2021/052417
§ 371 (c)(1),
(2) Date: Mar. 20, 2023

(87) PCT Pub. No.: WO2022/058740
PCT Pub. Date: Mar. 24, 2022

(65) Prior Publication Data

US 2023/0384598 A1 Nov. 30, 2023

(30) Foreign Application Priority Data

Sep. 21, 2020 (GB) ..................................... 2014845

(51) Int. Cl.
*G02B 27/00* (2006.01)
*G02B 27/01* (2006.01)

(52) U.S. Cl.
CPC .. *G02B 27/0172* (2013.01); *G02B 2027/0174* (2013.01); *G02B 2027/0178* (2013.01)

(58) Field of Classification Search
CPC ........ G02B 27/0172; G02B 2027/0174; G02B 2027/0178; G02B 27/0081; G02B 27/00;
(Continued)

(56) References Cited

U.S. PATENT DOCUMENTS

| | | | |
|---|---|---|---|
| 8,810,913 | B2 | 8/2014 | Simmonds et al. |
| 8,842,368 | B2 | 9/2014 | Simmonds et al. |

(Continued)

FOREIGN PATENT DOCUMENTS

| | | | |
|---|---|---|---|
| DE | 10 2017 119 440 | A1 | 2/2019 |
| GB | 2553382 | A | 3/2018 |

(Continued)

OTHER PUBLICATIONS

International Search Report dated Dec. 13, 2021 from corresponding International Application No. PCT/GB2021/052417, 5 pages.

(Continued)

*Primary Examiner* — Henry Duong
(74) *Attorney, Agent, or Firm* — Ruggiero McAllister & McMahon LLC

(57) ABSTRACT

An optical system is provided and includes: a cylindrical waveguide, having concentric inner and outer surfaces defining a common cylinder axis; and input optics, arranged to receive light from an image source and to cause the light to enter the cylindrical waveguide so that all rays originating from the same pixel of the image source are incident on a surface of the cylindrical waveguide at the same angle relative to the surface normal and at the same angle relative to a plane normal to the cylinder axis, at each point of incidence, the in-coupled light thereby retaining its direction angle as it propagates along the cylindrical waveguide. An optical display device, which can form part of a head-mounted display can be provided using the optical system.

18 Claims, 9 Drawing Sheets

(58) Field of Classification Search

CPC ... G02B 5/18; G02B 6/00; G02B 6/10; G02B 27/01; G02B 27/0101; G02B 27/42; G02B 2006/12083; G02B 2027/0185; G02B 27/0103; G02B 27/0149; G02B 27/017; G02B 27/0176; G02B 27/0179; G02B 27/0189; G02B 2027/0105; G02B 2027/0107; G02B 2027/0109; G02B 2027/011; G02B 2027/0112; G02B 2027/0114; G02B 2027/0116; G02B 2027/0118; G02B 2027/012; G02B 2027/0121; G02B 2027/0123; G02B 2027/0125; G02B 2027/0127; G02B 2027/0129; G02B 2027/013; G02B 2027/0132; G02B 2027/0134; G02B 2027/0136; G02B 2027/0138; G02B 2027/014; G02B 2027/0141; G02B 2027/0143; G02B 2027/0145; G02B 2027/0147; G02B 2027/015; G02B 2027/0152; G02B 2027/0154; G02B 2027/0156; G02B 2027/0159; G02B 2027/0158; G02B 2027/0161; G02B 2027/0163; G02B 2027/0165; G02B 2027/0167; G02B 2027/0169; G02B 2027/0181; G02B 2027/0183; G02B 2027/0187; G02B 2027/019; G02B 2027/0192; G02B 2027/0194; G02B 2027/0196; G02B 2027/0198

USPC .......................................................... 359/630

See application file for complete search history.

(56) References Cited

U.S. PATENT DOCUMENTS

| | | | | |
|---|---|---|---|---|
| 9,733,475 | B1 * | 8/2017 | Brown | G02B 6/003 |
| 10,048,647 | B2 | 8/2018 | Large et al. | |
| 2010/0315719 | A1 | 12/2010 | Saarikko et al. | |
| 2012/0300311 | A1 * | 11/2012 | Simmonds | G02B 27/0172 359/630 |
| 2016/0195720 | A1 | 7/2016 | Travis et al. | |
| 2018/0120559 | A1 * | 5/2018 | Yeoh | G02B 5/18 |
| 2018/0292593 | A1 | 10/2018 | Alexander | |
| 2018/0321736 | A1 | 11/2018 | Masson | |
| 2018/0348527 | A1 | 12/2018 | Potnis et al. | |
| 2018/0373115 | A1 | 12/2018 | Brown et al. | |
| 2019/0072767 | A1 | 3/2019 | Vallius et al. | |
| 2019/0317261 | A1 | 10/2019 | Dimov et al. | |
| 2019/0369403 | A1 | 12/2019 | Leister | |
| 2020/0166754 | A1 * | 5/2020 | Leister | G02B 5/3083 |
| 2020/0225475 | A1 * | 7/2020 | Muenz | G02B 6/0076 |

FOREIGN PATENT DOCUMENTS

| | | | |
|---|---|---|---|
| WO | 2006/064301 | A1 | 6/2006 |
| WO | 2009/077803 | A1 | 6/2009 |
| WO | 2011/089433 | A1 | 7/2011 |
| WO | 2014/020073 | A1 | 2/2014 |
| WO | 2019/038374 | A1 | 2/2019 |

OTHER PUBLICATIONS

Written Opinion dated Dec. 13, 2021 from corresponding International Application No. PCT/GB2021/052417, 6 pages.

Dehoog, Edward, Jason Holmstedt, Tin Aye, "Field of view of limitations in see-through HMD using geometric waveguides", Applied optics 55.22 (2016): 5924-5930.

Kalinina, Anastasiia, and Andrey Putilin , "Wide-field of-view augmented reality eyeglasses using curved wedge waveguide (Conference Presentation)" Digital Optics for Immersive Displays II. vol. 11350, International Society for Optics and Photonics, 2020.

* cited by examiner

OPTICAL SYSTEM WITH CYLINDRICAL WAVEGUIDE

CROSS REFERENCE TO RELATED APPLICATIONS

This application is a national stage entry of International Application No. PCT/GB2021/052417 filed on Sep. 17, 2021, which claims priority from United Kingdom Application No. 2014845.8 filed on Sep. 21, 2020, the contents of each of which are incorporated by reference herein in its entirety.

TECHNICAL FIELD OF THE DISCLOSURE

The disclosure concerns an optical system that may form part of an optical display device, for example a head-mounted display.

BACKGROUND TO THE DISCLOSURE

In the field of augmented reality, a virtual image is displayed to a user overlaid on the real world using a transparent combiner which redirects an image from a projector to the user's eye. Current solutions commonly use a flat or planar transparent waveguide made from a glass or plastic substrate, where the light is in-coupled to the waveguide via a diffraction grating (or similar) and traverses inside the waveguide (by means of total internal reflection) to a similar out-coupler, where it is out-coupled to the user's eye. In this field, the thickness of the waveguides are typically a few millimetres, they are also termed "light-guides".

Referring to FIG. 1, there is shown a schematic diagram of such an optical system, comprising a planar waveguide. The optical system comprises: an object display (image source) 10; a collimating lens 20; a planar waveguide 30; an in-coupler 40 (for example, a grating); and an out-coupler 50. Rays 60 from a point on the object display 10 are shown. These are incident at the normal to the surface of the waveguide. The path of a single ray 70 through the waveguide 30 and via the out-coupler 50 to a user eye 80 is also shown. The thickness of waveguide 30 is in the order of magnitude of a few millimetres, the separation between in-coupler 40 and the out-coupler 50 is in the order of magnitude of centimetres, and the lateral period of the grating of the in-coupler 40 is in the order of magnitude of a fraction of a micron.

In such a typical planar waveguide design, the object display 10 is imaged by the collimating lens 20 at the focal distance of the lens 20. This collimates the image-bearing light in both horizontal and vertical (tangential and sagittal) planes.

The collimated light is coupled into the waveguide by in-coupler 40, which may be a linear diffraction grating or a holographic grating (other options include refractive optics such as prisms). This diffracts the light into the glass or plastic waveguide or substrate 30 at an angle greater than critical angle.

In designs considered herein, a diffraction grating, a holographic grating, a hologram, a surface hologram, an embossed hologram, a lithographically produced grating, a volume grating or a slanted grating can be used interchangeably and inter-operably. For the purpose of ray tracing, it is the lateral components of the grating period of the grating k-vector or momentum vector that matter. The particular material selection, production means and cross-section may affect diffraction efficiency, diffraction orders, mechanical flexibility and wavelength bandwidth, but not the aberrations and resolution. When a linear grating receives collimated light, it diffracts but preserves the collimation, that is all the rays from a given pixel change direction but stay parallel among themselves.

When the light hits the outer surface of the waveguide, it reflects back inside due to total internal reflection (TIR). These angles are determined by the refractive index n of the waveguide. Typical values are $n=1.5$ and a critical angle of 42 degrees and a guiding angle of perhaps 60 to 70 degrees to the normal. Higher refractive index glasses will allow for a greater field of view (FOV) due to the lower critical angle.

An advantage of this approach is that all the rays from a given pixel travel inside the flat waveguide at the same angle. Therefore, the rays are allowed to overlap or swap inside the waveguide without causing a problem of double or ghost images.

This may be key for realising a major function of the waveguide: pupil replication. In the field of Augmented Reality (AR), smaller optics are highly desirable. This means using small projectors. Small projectors produce a small pupil (essentially a ray bundle originating from the same pixel), which can be recognised, for example, by looking at the small pupil of common binoculars (small bright spot floating above the eyepiece).

The out-coupler 50 (waveguide output grating) can replicate the pupil by partial extraction of the light with a diffraction efficiency of less than 100% (termed a fractional diffraction efficiency). For example, 10% diffraction efficiency will extract 10% of light and let the remaining 90% propagate further. This process will repeat at the next encounter of the propagated light with the output grating 50. More advanced variable diffraction efficiency gratings help to balance the light intensity between different pupil replications.

This makes the task of light extraction by an output grating robust, in that the output grating does not need to be located in a specific place. The exit pupil of the waveguide can be treated as one continuous pupil extending over the whole of the output grating 50. Likewise, the expanded pupil does not shift along the output grating as a function of the field (location of originating pixel on display).

A two-dimensional pupil expansion is realised by replicating a pupil in one direction followed by replication in another direction by partial diffraction, firstly by an intermediate linear grating and secondly by an output linear grating. In total, three or more gratings would be used, as realised in the waveguides of HoloLens® marketed by Microsoft Corporation and those marketed by WaveOptics, Ltd.

A limitation of this approach is that the glass of the waveguide 30 must be flat, whereas consumers are used to glasses that are curved. It is also hard to combine flat waveguides with curved prescription glasses, without making the unit bulkier. There are also applications where highly curved glass is used, for example visors for motorbike helmets, military visors, fighter pilot helmets, dive goggles, firefighting thermal visors, medical protection, welding masks, airplane windscreens, automobile or scooter windscreens and more. Attempts to fit a flat waveguide inside the limited space available between the user and the visor are challenging.

There are also combiner solutions based upon free space reflective optics but these typically have small eye-boxes (area where the image is viewable). These are unsuitable for some applications, whereas waveguide solutions typically have large eye-boxes which makes them desirable. A large eye-box means that a single variation of a design of AR glasses can fit most of the population and the user can easily see the virtual image. A small eye-box means the AR glasses may need to be mechanically adjusted or fitted to a particular user, due to user variations in inter-pupillary distance (IPD), increasing cost and complexity.

The use of curved waveguides has been suggested in a variety of documents, for example WO-2006/064301 A1, US-2010/0315719 A1, DE-102017119440 A1, U.S. Pat. Nos. 8,842,368 B2, 8,810,913 B2, 9,733,475 B1, US-2018/0292593 A1, US-2019/0317261 A1, GB-2553382 B, U.S. Pat. No. 10,048,647 B2, US-2016/0195720 A1, US-2019/0072767 A1, US-2018/0373115 A1, US-2019/0369403 A1 and US-2018/0348527 A1. Similar suggestions are discussed in: Kalinina, Anastasiia, and Andrey Putilin, "Wide-field-of-view augmented reality eyeglasses using curved wedge waveguide (Conference Presentation)", Digital Optics for Immersive Displays II. Vol. 11350, International Society for Optics and Photonics, 2020; and DeHoog, Edward, Jason Holmstedt, and Tin Aye, "Field of view of limitations in see-through HMD using geometric waveguides", Applied optics 55.22 (2016): 5924-5930.

Some of these documents only mention curved waveguides in brief. Others discuss a curved waveguide in more detail, but none explains how to replicate a pupil in a continuous way without rays from the same pixel diverging when projected at infinity. For these approaches, there is generally only a single pupil propagated through the waveguide, which does not allow for pupil expansion. Other designs rely on eye-tracking. These designs typically produce an aberrated output and require complex software to pre-distort the input image. Such solutions would therefore be expensive and complicated to manufacture.

While there are numerous existing planar waveguide-based approaches on the market, there are no curved or cylindrical waveguide products available on the market, despite the many suggested implementations, including those discussed above. This appears to be due to the difficulty of propagating light through the waveguide without the image becoming highly aberrated (causing poor quality) when output to the user.

Mitigating this problem whilst achieving a product that can be manufactured for a mass market remains a challenge.

SUMMARY OF THE DISCLOSURE

Against this background, there is provided an optical system in accordance with claim 1. Other preferred and optional features are defined in the other claims and elsewhere in this disclosure.

An optical system is considered using a cylindrical waveguide, having concentric (inner and outer) surfaces. Using a cylindrical waveguide of such a structure may allow light to travel between the curved surfaces without aberration. This is advantageously implemented together with input optics that are arranged to receive light from an image source (particularly, a pixelated image source or an image source having a light output that can at least notionally be divided into pixels) and to provide the light to the cylindrical waveguide. All rays from the same pixel of the image source are incident on the cylindrical waveguide at the same angle relative to an incidence surface normal at each point of incidence. All rays from a central pixel of the image source are therefore incident at any point on the cylindrical waveguide, normal to the cylindrical surface. Rays from non-central pixels are incident at the same angle relative to the surface normal at each point of incidence. Moreover, all rays from the same pixel of the image source are incident on the cylindrical waveguide at the same angle relative to a plane normal to the cylinder axis at each point of incidence. Thus, the direction of propagation of all of the rays remains the same.

In view of the input optics and the waveguide structure, light received at the cylindrical waveguide (typically in-coupled to the cylindrical waveguide) retains its direction angle as it propagates along the cylindrical waveguide. That is, all the rays from a given pixel, no matter how far propagated, will approach an output grating at the same angle as measured between the ray and the surface, at the point of the incidence of each ray. Typically, the input optics comprises in-coupling (or injection) optics.

Out-coupling optics may be arranged to receive light propagated along the cylindrical waveguide and present the light as an image to an object (particularly an eye of a user, that is, a viewer). The image source (for instance, an electronic display) and/or an image source mounting (on which an image source can be positioned) may form part of the optical system in some embodiments.

The optical system may be used to implement an optical display device (for example, a head-mounted display). Beneficially, the image source is configured to direct light towards the in-coupling optics. A mounting arrangement that is configured to be wearable by a user (for example, forming part of a headset, visor, optical glasses) may be used to position the optical system, at least such that the out-coupling optics presents the light as an image to an eye of the user. In a preferred embodiment, the cylindrical waveguide is integrated with, embedded in or affixed to an eyeglass or visor component of the mounting arrangement.

A particular facet of the in-coupling optics for coupling received light into the cylindrical waveguide is a diffraction grating. Advantageously, a linear diffraction grating is used, having a constant period. The period is measured in a lateral direction along the grating surface. The in-coupling linear diffraction grating is beneficially applied to a curved surface. A preferred implementation of this in-coupling linear diffraction grating uses a flexible holographic material. The in-coupling linear diffraction grating may be attached to the surface of the cylindrical waveguide (and preferably conforms to the surface with no air gap). Alternative structures that do not use an in-coupling grating (or at least one of this form) may be considered. For example, the waveguide need not be entirely cylindrical, such that only a portion of the waveguide is cylindrical with the properties discussed above. Light may enter the waveguide through another portion, which may therefore form part of the input optics.

Unlike traditional collimating optics used for flat waveguides, the input optics proposed in this disclosure would not be correctly termed a collimator in classical optical design terminology, because the rays from a pixel are not parallel. Rather, the preferred in-coupling (projector) optics comprise an optical device arranged to collimate or conform light (only) in a plane passing through (that is, neither parallel to nor entirely including) and more preferably, perpendicular to the cylinder axis. For glasses and helmets, for instance, the cylinder axis is vertical and the plane is preferably horizontal. In this way, the rays are incident on the input grating at the same angle in this plane. A wavefront shaping device, for example a cylindrical lens and/or mirror, can be used for this task. As usual in optical design best practices, the central pixel rays would advantageously be incident at an angle normal to the surface of the waveguide, to make aberration management easier because of symmetry. Other pixels in this plane would produce rays incident on the input grating at other angles, but would be parallel to other rays from the same pixel.

In a plane orthogonal to the cylinder axis (for instance, a horizontal plane), however, the light may not be collimated, but rather shaped in such a way that rays from the same pixel have the same angle of incidence with respect to surface normal, where this normal is considered separately for each different point of incidence. All the surface normals direct towards the cylinder axis.

The simplest wavefront shape satisfying this condition is the cylindrical wavefront concentric with the cylindrical shape of the waveguide. The rays from the central pixel would then propagate radially from the waveguide cylinder axis and approach the surface at normal incidence. This wavefront is advantageously formed by positioning the image source (display) with a centre of the image source at the waveguide axis. A cylindrical lens or mirror is then arranged to have optical focussing power only in a vertical plane.

Optionally, further or different input optics may be provided, for example to optimise the performance for more or all pixels and/or to minimise the volume of the projector. This may include utilising optics with focussing in a horizontal plane to bring the display closer. Where a concave mirror is used, the image source and/or in-coupling optics may be arranged such that light approaches the waveguide from the opposite side of the waveguide from the mirror before being reflected and then diffracted.

Light may propagate through the cylindrical waveguide (for example, between the in-coupling optics and the out-coupling optics) in a direction (defined by a vector) that is parallel to the cylinder axis (for instance, vertical) or a direction (defined by a vector) that is perpendicular to the cylinder axis (which may be horizontal, specifically around the circumference of the waveguide) or a direction defined by a vector that is between parallel and perpendicular to the cylinder axis (typically, diagonal).

The out-coupling optics typically comprises an out-coupling diffraction grating. In principle, a linear grating could be used. However, a practical use of the waveguide is with the viewer on the inside of the cylinder. Therefore, a simple linear grating may not be appropriate to extract the light in such circumstances, as it will focus it in a horizontal plane at the cylinder axis (resulting in a vertical line of light), rather than far ahead of the viewer. In contrast, a diverging lens property may collimate the light in the horizontal direction (in the vertical direction it is already collimated). This may be achieved by adding a negative optical power to the output grating in the horizontal direction. By analogy, the grating is the sum of a prism function and a cylindrical negative lens function. There are many known examples of how to record such a grating. Such a grating will not be termed "linear" in contrast to the input grating. The output grating can be chosen to place the digital image at any distance from the viewer by adding more focussing in both planes.

In cases where the cylindrical waveguide is embedded inside a head-mounted structure that already corrects for the eyesight of the user (for instance, prescription glasses), the input and output gratings may also be corrected to take this into account. The main factor is to preserve the aforementioned conditions of the light as it propagated inside the waveguide regardless of how the light approached and leaves the "sandwich" of the overall stack.

In preferred embodiments, the image source and/or image source mounting may be positioned on the side of the inner surface of the cylindrical waveguide (closer to the cylinder axis), with the in-coupling optics being located between the image source and the inner surface of the cylindrical waveguide. Alternatively, the image source and/or image source mounting may be positioned on the side of the outer surface of the cylindrical waveguide (distal the cylinder axis). Then, a mirror (which may also act as the input wavefront shaping device, as discussed above) may be arranged to receive light from the image source and reflect the received light towards the cylindrical waveguide. In such embodiments, light from the image source may pass through the cylindrical waveguide before reaching the mirror.

An intermediate optical grating (or more than one intermediate optical grating) in the cylindrical waveguide may redirect, diffract and/or split light before the out-coupling optics. Advantageously, one or more intermediate optical gratings can each be a linear grating, to preserve the angular properties of the propagating light (TIR condition and that all rays from the same pixel are incident on the cylindrical waveguide surface at the same angle relative to the surface normal and at the same angle relative to a plane normal to the cylinder axis), thereby allowing for two-dimensional pupil expansion without aberration.

Multiple cylindrical waveguides may be used. Then, the out-coupling optics may create different foci for the light from each waveguide.

Various combinations of features described above and elsewhere herein may also be considered. Methods of manufacture and/or operating an optical system or optical display device may also be considered. These may have corresponding structural features to those discussed herein.

BRIEF DESCRIPTION OF THE DRAWINGS

The disclosure may be put into practice in a number of ways and preferred embodiments will now be described by way of example only and with reference to the accompanying drawings, in which.

Throughout the disclosure, where the same features are shown in different drawings, identical reference numerals are used.

DETAILED DESCRIPTION

The novel approach proposed in the present disclosure is advantageously intended for an augmented reality head mounted device. The approach is based on a cylindrical waveguide and considers the system as a whole. In particular, this may include matching the curvature of the waveguide to the wavefront of the input light. The system is also straightforward and inexpensive to manufacture and align. Also, the cylindrical shape of the waveguide fits better inside the shape of prescription glasses, as it is easier to fit a cylinder between spherical surfaces than a flat waveguide plate. This may reduce the overall thickness from about 15 mm down to about 5 mm. It is also possible to embed waveguides within prescription glasses by using air gaps or refractive index variations (for example, see US-2018/0348527 A1, the details of which are incorporated herein by reference).

Figure 1:
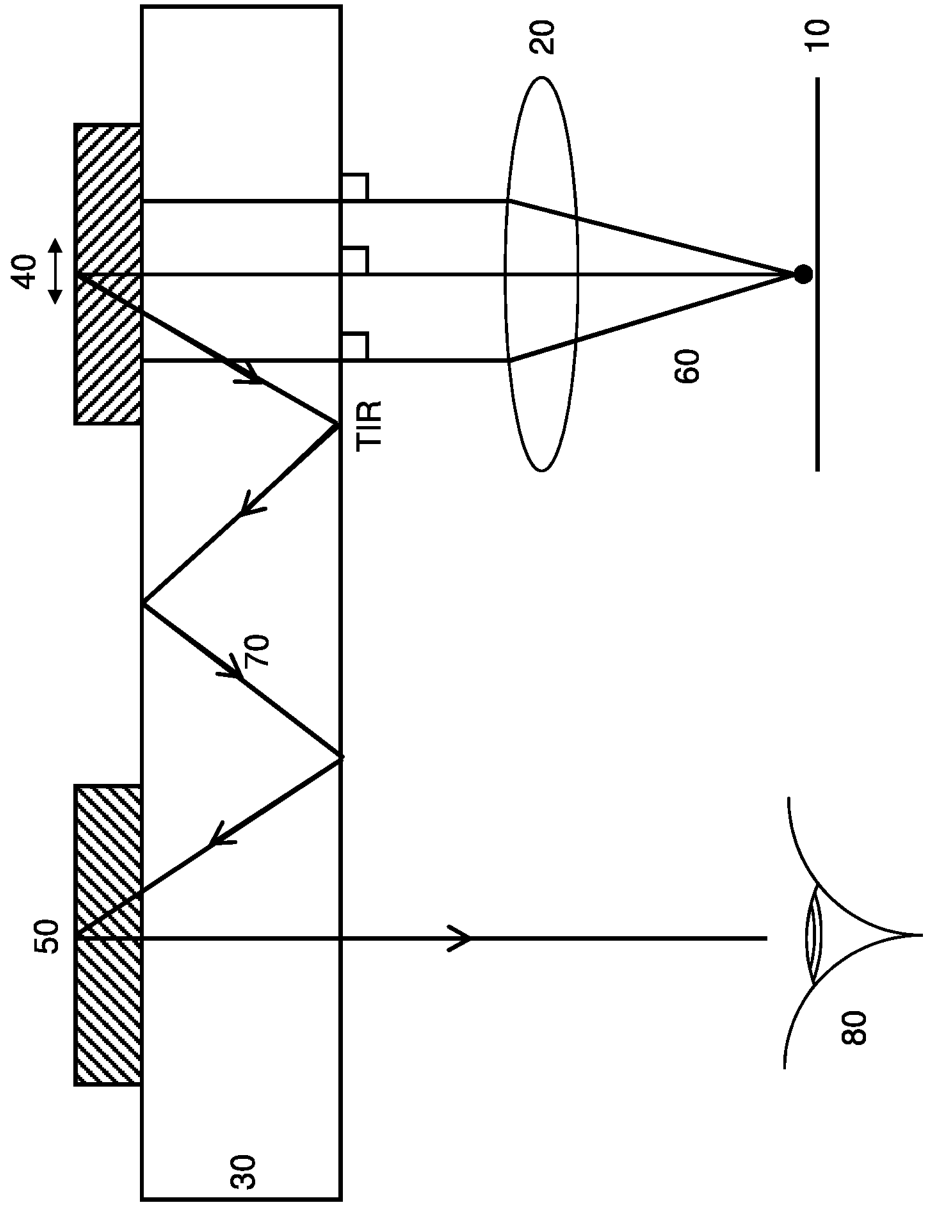
FIG. 1 shows a schematic diagram of an existing optical system, comprising a planar waveguide.
Figure 2:
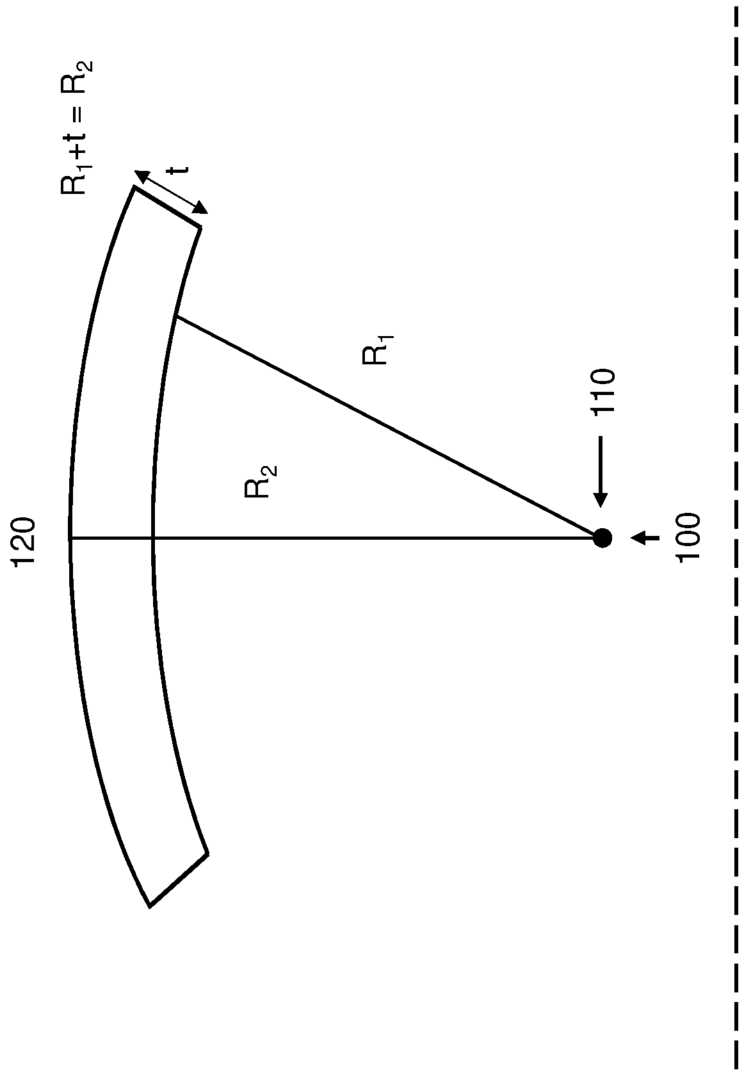
FIG. 2 schematically illustrates a cylindrical waveguide for use with the disclosure.

Referring first to FIG. 2, there is schematically illustrated a cylindrical waveguide for use with the disclosure. There is shown: an image source (object display) 110; and a cylindrical waveguide 120. The cylindrical waveguide 120 has two concentric surfaces, with a constant thickness (t) between the surfaces. The image source 110 is located at the centre of curvature 100 of the cylindrical waveguide 120. The distances are shown between the centre of curvature 100 and: the inner surface of the cylindrical waveguide 120 ($R_1$); and the outer surface of the cylindrical waveguide 120 ($R_2$). It is clear that $R_2=R_1+t$ and this applies irrespective of where on the cylindrical waveguide 120 these two distances are measured. In other words, such a cylindrical waveguide 120 has a common centre of curvature and the radii of the inner and outer surfaces cylindrical waveguide 120 of the cylindrical waveguide 120 are separated by the thickness of the waveguide (t). The simple concentric shape of such a cylindrical waveguide 120 makes manufacturing cheaper and tolerances easier for mass production.

Figure 3:
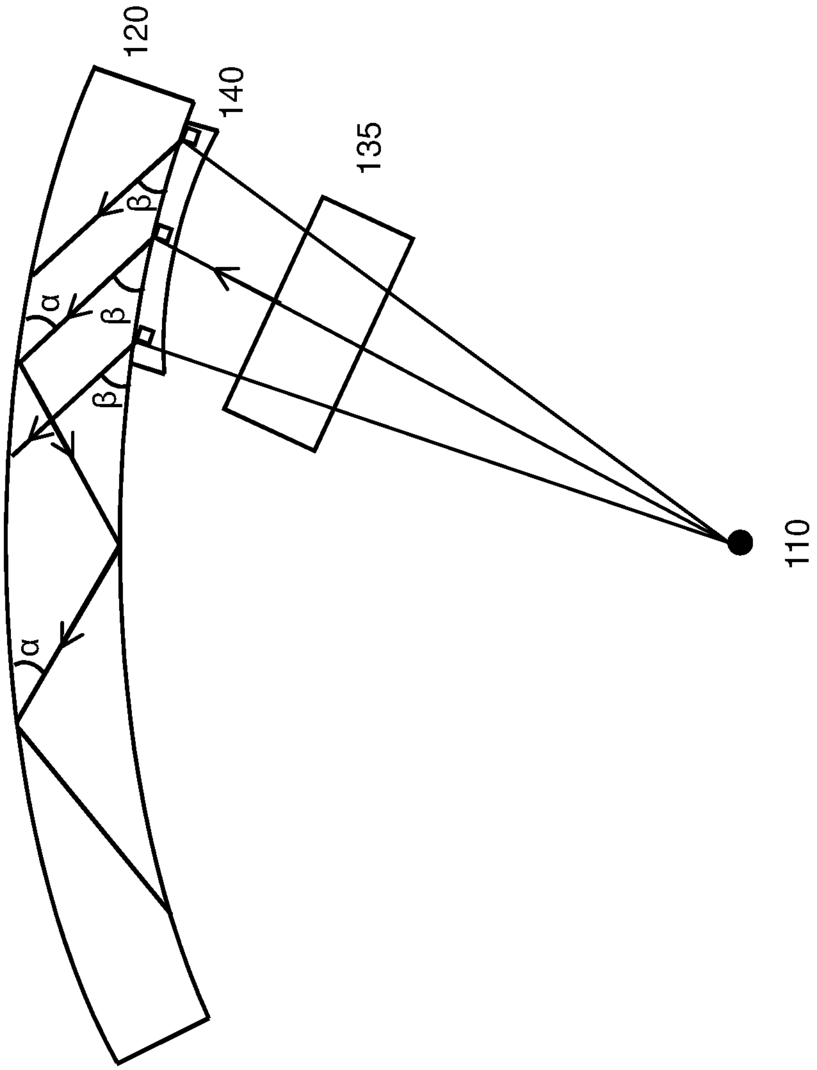
FIG. 3 schematically illustrates properties of the cylindrical waveguide of FIG. 2 for use with the disclosure.

Next referring to FIG. 3, there are schematically illustrated properties of the cylindrical waveguide of FIG. 2 for use with the disclosure. There is additionally shown: a cylindrical lens 135; and a diffraction grating 140. Rays from the central pixel of the image source 110 (located at the centre of the radius of curvature of the concentric surfaces of the cylindrical waveguide 120) are collimated in one plane by the cylindrical lens 135 through focusing, which may be termed wavefront shaping. The rays with such wavefront shaping are then coupled into the cylindrical waveguide 120 at angle β by the diffraction grating 140. The incident rays are normal to the surface of the input grating at every point along the surface of the grating. Angle β is such that the angle between the normal and the internal ray is less than the critical angle for the waveguide, such that β will typically be less than 48 degrees and more preferably at least 30 degrees and up to 40 degrees. Pixels other than the central pixel are coupled into the waveguide at a slightly different angle, e.g. β+1, but this angle will be constant at every point along the surface of the grating.

The paper authored by DeHoog et al referenced above ("Field of view of limitations in see-through HMD using geometric waveguides") has shown that if (and only if) the two surfaces of a cylindrical waveguide are concentric, as shown by cylindrical waveguide 120 of FIGS. 2 and 3, then the angle of incidence of a light ray on the outer surface is the same after one bounce on the inner surface. Therefore, the light ray will retain its direction angle as it propagates along the waveguide, which is not the case with any other choice of surface radii. As shown in FIG. 3, if the angle is α when the ray bounces off the outer surface, it will make an angle of β with the inner surface, but then make an angle of α at the next bounce on the outer surface. In other words, the angles of incidence inside the waveguide are the same on every other bounce off the surface of the waveguide. Rays from a pixel incident on the left, centre or right of the grating will approach the inner surface at the same angle throughout the waveguide after bouncing off the outer surface. Pixels other than the central pixel will have a different value of α and β but the relationship identified above still holds. This property allows for pupil replication.

It has been recognised that, by causing all light rays from the same point on the image source to be incident on such a cylindrical waveguide 120 at the same angle, a high performance and compact optical system can be implemented. In-coupling optics, for instance the cylindrical lens 135 and the diffraction grating 140, can be configured to meet this desideratum.

Although the central ray angle is typically discussed, there are other angles generated by the image source object 110 (for example, a micro-display), which generate the field of view of the image to the user. These other ray angles are propagated in the same manner through the cylindrical waveguide 120. There will be some small aberration (loss of image quality) of the rays from the edges of the field (edges of the object) but this will largely not be noticeable to the user and can be compensated by optical means (as is well known in the art). Ideally aberrations should be kept under 1 arc minute, which is human acuity.

It should be understood here that these aberrations do not accumulate with the number of bounces. For example, if a ray from a given pixel diffracts into the waveguide at angular range of 60.0+/−0.1 degree, then after any number of bounces and pupil replications, the angular resolution of the whole system will still support +/−0.1 degree resolution, no matter how these rays swap or shuffle. This contrasts with waveguides that accumulate aberrations along the transmission.

In a general sense and according to one aspect, there may thus be considered an optical system comprising: a cylindrical waveguide with input optics. The cylindrical waveguide has concentric (concave) inner and outer surfaces, thereby causing preservation of the angle of light propagated through the cylindrical waveguide. The concentric surfaces define a common cylinder axis (a common centreline). The input optics are arranged to receive light from an image source and to cause the light to enter the cylindrical waveguide, such that all rays originating from the same point on the image source are incident on a surface of the cylindrical waveguide at the same angle relative to a surface normal at the point of incidence. The input optics are also arranged such that all rays originating from the same point on the image source are incident on the cylindrical waveguide at the same angle relative to a plane normal to the cylinder axis at the point of incidence. This combination of features means that the light entering the cylindrical waveguide retains its direction angle as it propagates along the cylindrical waveguide.

Preferably, the input optics comprises in-coupling optics, configured to couple the light into a surface of the cylindrical waveguide (in preferred embodiments, the inner surface). Advantageously, out-coupling optics are arranged to receive light propagated along the cylindrical waveguide and present the light as an image to an object. Optionally, the optical system may comprise the image source (display, for example micro-display) and/or a mounting for the image source (an image source mounting).

Further aspects according to the disclosure may be considered. For example, an optical display device may comprise: the optical system as herein described, including the image source being configured to direct light towards the in-coupling optics; and a mounting arrangement, in particular configured to be wearable by a user. The mounting arrangement may position the optical system such that the out-coupling optics presents the light as an image to an eye of the user. For example, this may include a glasses frame, a visor or helmet structure or other wearable mounting. Optionally, a head-mounted display may be considered, comprising such an optical display device. In this case, the mounting arrangement may include an eyeglass or visor component. Advantageously, the cylindrical waveguide being integrated with, embedded in or affixed to the eyeglass or visor component.

Another aspect may be considered in a method of manufacturing and/or operating such an optical system. For instance, a method of manufacturing an optical system may include: providing a cylindrical waveguide having concentric inner and outer surfaces; and arranging input optics (for instance, comprising in-coupling optics) to receive light from an image source and to cause the light to enter the cylindrical waveguide, such that all rays originating from the same point on the image source are incident on a surface of the cylindrical waveguide at the same angle relative to a surface normal and at the same angle relative to a plane normal to the cylinder axis at the point of incidence. The method may further comprise configuring out-coupling optics to receive light propagated along the cylindrical waveguide and present the light as an image to an object. Analogously, a method of operating an optical system may comprise: directing light from an image source to input optics of a cylindrical waveguide, such that all rays originating from the same point on the image source are incident on the cylindrical waveguide at the same angle relative to a surface normal and at the same angle relative to a plane normal to the cylinder axis at the point of incidence. Preferably, light propagated along the cylindrical waveguide is presented as an image to an object (by out-coupling optics).

Further preferred, optional and advantageous features, in particular applicable to all aspects of the disclosure herein, will be discussed below. A specific embodiment is firstly discussed.

Figure 4:
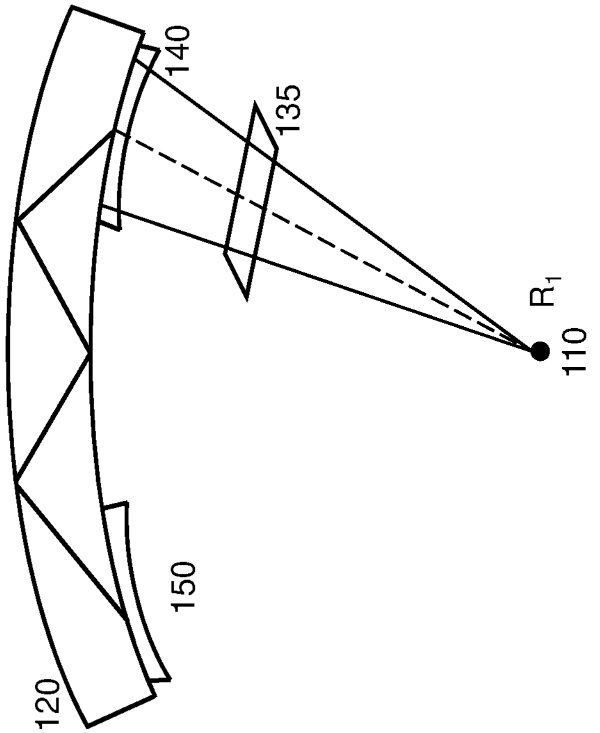
FIG. 4 depicts a schematic top down view of an optical system in accordance with a first embodiment of the disclosure.

Now reference is made to FIG. 4, in which there is depicted a schematic top down view of an optical system in accordance with a first embodiment of the disclosure. In this drawing, the plane of the page (and any parallel plane) is considered horizontal and the perpendicular plane coming out of the page (and any parallel plane) is considered vertical. The cylindrical waveguide 120 can therefore be visualised, for example, like a cylindrically shaped visor on a flat surface. Additionally shown in this drawing is out-coupling diffraction grating 150. The image source 110 is placed at a distance from the cylindrical waveguide 120 equal to the radius of curvature of the waveguide. As explained above, the cylindrical lens 135 collimates the input light (or conforms or adds power) in one plane only, specifically adding power in a vertical plane. This is then matched with a linear diffraction grating 140 as the input, which when applied to the curved surface of the cylindrical waveguide 120, propagates the image-bearing light along the waveguide with rotational symmetry (that is, the picture of the waveguide can be rotated around the cylinder axis, with rays from a given pixel will maintain the same angles with respect to the waveguide surfaces). This makes the system invariant to the placement of the output diffraction grating 150, eliminating the need for precise alignment. The output diffraction grating 150 compensates by applying negative focusing power to (that is, diverging) the light in the opposite plane (a horizontal plane), to provide an expanded eyebox with the output set at infinity to the user (not shown). This allows for pupil replication to enlarge the output eyebox.

This design therefore creates a wavefront within the cylindrical waveguide 120 that can propagate with rotational symmetry along the whole waveguide. The spherical wavefront emitted from the point source 110 is conformed in a horizontal plane (as noted above, the plane of the page of FIG. 4) to the curvature of the waveguide 120 by itself and power is added in a vertical plane (a plane in a direction coming out of the page of FIG. 4, as noted above) by the cylindrical lens 135. This means that after two bounces the angle of the light ray maps back onto itself, and this repeats indefinitely. Therefore, the pupil can be replicated (extracted multiple times) to expand the eyebox in one-dimension (horizontal). The size of the vertical eyebox is set by the vertical size of the cylindrical lens 135. It also relaxes the alignment tolerances (as the position of the out-coupler relative to the input pupil is not critical), the choice of the thickness of waveguide and the central ray guiding angle.

Figure 5A:
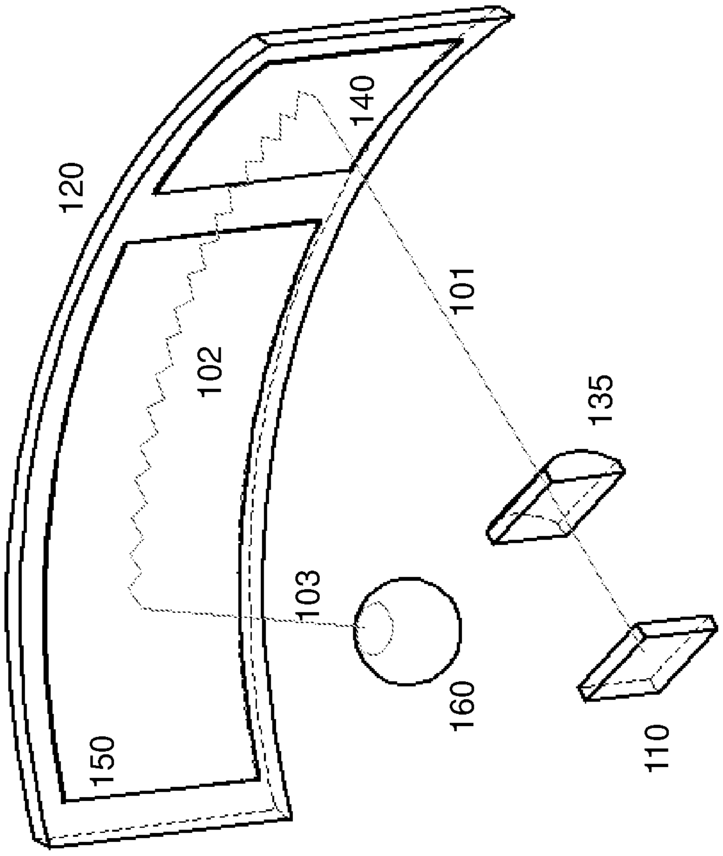
FIG. 5*a* shows a perspective view of an embodiment in accordance with FIG. 4.
Figure 5C:
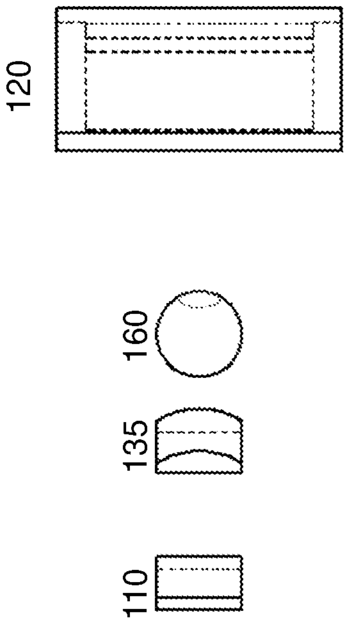
FIG. 5*c* depicts a side view of the embodiment of FIG. 5*a*.
Figure 5B:
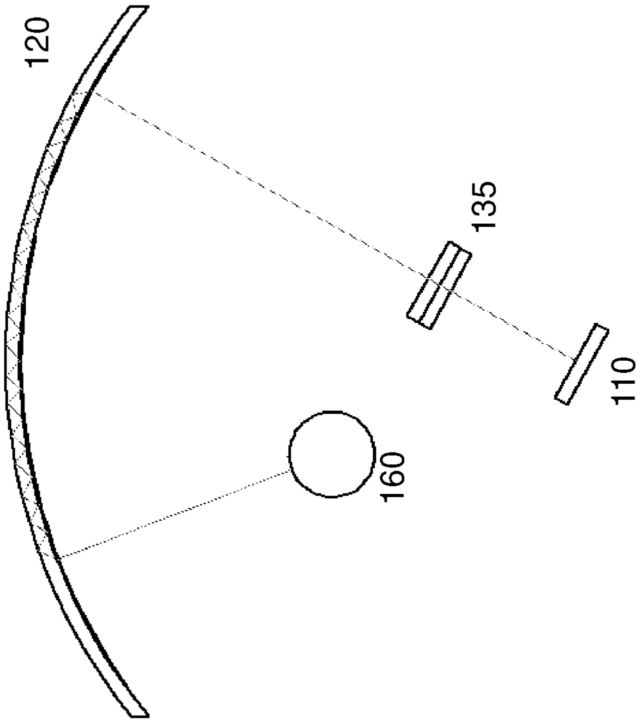
FIG. 5*b* depicts a top down view of the embodiment of FIG. 5*a*.

Referring next to FIG. 5*a*, there is shown a perspective view of an embodiment in accordance with FIG. 4. In FIG. 5*b*, there is depicts a top down view of the embodiment of FIG. 5*a* and in FIG. 5*c*, there is depicts a side view of the embodiment of FIG. 5*a*. Light 101 that is collimated in one plane is coupled into the cylindrical waveguide 120, rays 102 propagate through the waveguide 120 and are coupled out by the diffraction grating 150, to provide the projected light 103 to the user eye 160.

In this specific embodiment, the image source or object 110 is a micro-display and is at a distance from the cylindrical waveguide 120 that is the same as the radius of curvature of the waveguide. This is achieved either by positioning the image source 110 physically at this distance or by virtually placing the image source 110 at this distance by optical means (for instance, lenses). The image is collimated in one plane by a cylindrical planoconvex lens 135 onto an in-coupler diffraction grating 140, positioned on the concave inner surface of the cylindrical waveguide 120. The cylindrical lens 135 is oriented such that the focusing power of the cylindrical lens 135 is in the opposing plane compared to the cylindrical waveguide 120. For example, if the curved waveguide is oriented horizontally, (oriented like a helmet visor or as placed on a table), it has power in a horizontal plane and would reflect light from a point source at the radius of curvature into a vertical line. The cylindrical lens 135 is then oriented in the opposing vertical plane and has power in a vertical plane and will focus light from a point source at the radius of curvature into a horizontal line.

The image bearing light is thus collimated in one plane only (a horizontal plane) before entering the waveguide, and the curvature of the cylindrical waveguide 120 conforms the light in a perpendicular (vertical) plane. This allows the entire pupil of light entering the waveguide to propagate along the waveguide, allowing for pupil expansion on the output.

The focal length of the cylindrical lens 135 determines the magnification of the object, and the lens 135 is set a distance of one focal length away from the object 110. If the cylindrical lens 135 were placed next to the cylindrical waveguide 120 then it would have a focal length approximately equal to the radius of curvature of the waveguide. For example, a typical radius of curvature of a visor-shaped waveguide of 200 mm would mean the object was 200 mm away and the cylindrical lens had a focal length of 200 mm. The distance of 200 mm from waveguide to object can be reduced for compactness either by folding the optical path with mirrors or optically setting the object distance virtually using lenses.

The choice of cylindrical lens 135 (diameter and/or focal length) determines the size of the vertical eyebox (determined by the diameter of the lens) and the focal length determines the magnification of the display 110 and hence the field of view (FOV) of the image (along with the size of the display). Typically, a multi element lens is used for cylindrical lens 135 (such as used in a camera) which provides for a good image quality across the whole FOV (small spot size RMS across the whole field). This is especially desirable for pupil replication systems to overlap the pupils precisely and provide a high-resolution image. The lens system is ideally achromatic for a full colour micro-display, although monochrome solutions are possible. The FOV of the curved waveguide 120 may be largely be determined by similar factors, but due to the nature of the curve around the user, the FOV will be expanded compared to a planar waveguide. This is as shown in the paper authored by DeHoog et al referenced above ("Field of view of limitations in see-through HMD using geometric waveguides").

The diffraction grating in-coupler 140 is a linear grating which has equal surface spacing (pitch) between grating lines (or equivalently, equal fringe spacing in a volume holographic grating). The grating can be made lithographically or interferometrically. All rays collimated in one plane, which are normally incident (90 degrees to surface) across the width of the grating surface, are then diffracted at the same angle inside the waveguide and this allows for pupil replication.

A grating on a curved waveguide typically means that the collimated light is not normally incident across the grating width due to the curve of the waveguide. Typical solutions to this involve varying the pitch of the grating to compensate for this, or recording a hologram directly on a curved surface, or lithographically etching on a curved surface, which is complicated and expensive. In the preferred embodiment according to the present disclosure, the in-coupling grating 140 is fabricated as a planar linear grating on a flat substrate (as is well known in the art and is relatively inexpensive and straightforward to manufacture compared to variable gratings). The grating 140 can be made on any flexible holographic material, for example a photopolymer (for instance, Bayfol® as marketed by Covestro AG or a silver halide film), then attached (laminated) onto the cylindrical surface of the waveguide, conforming to the cylindrical surface. The grating 140 is index matched, preferably by lamination (or another index matching glue or liquid), such that it conforms to the shape of the cylindrical surface and desirably, such that there is no air gap. It is straightforward and inexpensive to record a hologram on a flat substrate and then remove and laminate the flexible holographic material on a planar or cylindrical substrate (curved in one dimension only), whilst it is more difficult to record on a curved surface or laminate on a spherical surface (curved in two dimensions).

It may also be possible to etch slanted gratings and use embossing or UV-curing resin techniques. The grating may then be transferred onto the cylindrical waveguide.

The grating pitch is designed to diffract the central wavelength of the micro-display 110 at the desired internal angle. As the grating is nominally designed to diffract normal incidence light at an angle, the grating has an inclination angle and the pitch is normally specified as the separation between gratings as measured along the planar surface of the grating. This is kept constant, that is a linear grating, for the input coupler.

For planar waveguides, both couplers are typically linear and identical. The system then behaves like a periscope and the magnified image of a micro-display is presented to the viewer overlaid on the real world. The design of the system as a whole means that the positional pixel information of the display is converted via collimation to angular information and then returned to positional information at the human retina.

Traditionally with flat waveguides, the input and output gratings are linear, parallel and have identical period to cancel chromatic aberration. This is important for use with broadband light sources, for example a light emitting diode (LED). An output grating according to the present disclosure has variable period along the waveguide and does not cancel the chromatic aberration in every place. However, the period of the output grating at the centre can be chosen to be identical to the input grating period, to minimise this aberration.

Alternatively, narrow band sources such as a laser light source, super-luminescent light emitting diodes (SLEDs) or notch filtered narrow band LEDs can be used. A narrow band source may help to minimise chromatic aberration. They may also limit the FOV of the output image, but thin holographic volume gratings can be used to mitigate this. For example, typical thicknesses of the holographic volume gratings may be at least 3 microns and up to 6 microns. This may provide a typical spectral bandwidth of approximately 20 nm full width half maximum (FWHM) and an angular bandwidth in air of approximately 6 degrees FWHM.

The cylindrical waveguide may form part of a head-mounted structure that already corrects for the eyesight of the user (for instance, prescription glasses). Then, the in-coupling grating 140 and the out-coupler diffraction grating 150 may also take this into account, without affecting the propagation of the light inside the waveguide and its effective out-coupling.

As an example, when the waveguide is embedded within otherwise traditional prescription meniscus positive lens, the outer covering lens may have a convex spherical surface and a concave cylindrical surface. The inner liner lens may have a convex cylindrical surface and a concave spherical surface. Consequently, the see-through optical properties will be defined by the outmost convex and innermost concave surfaces to be chosen to suit the wearer's prescription. The focus of the digital image provided via the cylindrical waveguide will independently be defined by the innermost surface together with the output grating optical property (optical power). An artisan in the field will likewise incorporate astigmatism in the see-through and the digital images to suit a prescription from an optician.

The output grating can be chosen to place the digital image at any distance from the viewer by adding more focussing in both planes. In a vertical plane, the light in-coupled to the waveguide is collimated, but the light output from the out-coupling grating need not be collimated. To allow for multiple pupil extraction, only part of the light may be extracted at the first part of the out-coupler grating 150. To balance the uniformity of the light extracted across the out-coupler grating 150, the far end of the out-coupler grating 150 (with reference to the in-coupling grating 140) desirably has higher efficiency than the near (receiving) end. The diffraction efficiency of the output grating is advantageously chosen low enough to allow enough pupil replication (for example, 5-25%) at the receiving end of the output grating 150, but high enough at the far end for satisfactory brightness (for example, 20-100%).

Returning to the generalised sense of an aspect discussed above, it can be understood that the in-coupling optics may comprise an in-coupling linear diffraction grating arranged to couple received light into the cylindrical waveguide. This advantageously has a constant period. The in-coupling linear diffraction grating is beneficially applied to a curved surface, in particular index-matched (with no air gap).

In another generalised sense, according to a further aspect, there may be considered an optical system, comprising: a cylindrical waveguide, having concentric inner and outer surfaces; and an in-coupling linear diffraction grating applied to a curved surface and arranged to couple received light into the cylindrical waveguide. Optionally, this optical system may further comprise an out-coupling linear diffraction grating, arranged to receive light propagated along the cylindrical waveguide and present the light as an image to an object. In a preferred embodiment, an wavefront shaping device may be configured to collimate or conform received light in a single plane and direct the collimated light to the in-coupling linear diffraction grating. A method of manufacturing and/or operating such an optical system may be further considered, for instance as discussed below. Further features below may be applied to any of the aspects disclosed herein.

In yet another aspect, there may be considered a method of manufacturing a curved linear diffraction grating. The method comprises: forming a linear diffraction grating on a planar surface; and attaching the linear diffraction grating to a curved surface of a (cylindrical) substrate, such that the linear diffraction grating conforms to the curved surface. Similarly to the other aspects considered herein, the additional features discussed below (and elsewhere herein) may be analogously applied to this aspect.

Additional features applicable to all aspects are now discussed. For example, the in-coupling linear diffraction grating may be made from a flexible holographic material. Optionally, the in-coupling linear diffraction grating is attached to (and/or conforms to) the inner surface of the cylindrical waveguide. In preferred embodiments, the in-coupling linear diffraction grating has straight gratings. A grating thickness and an angular bandwidth of the in-coupling linear diffraction grating may be configured for (substantially) uniform visible-range colour transmission across a width of the in-coupling linear diffraction grating.

Preferably, the input optics comprise a wavefront shaping device (which might be considered a form of collimator), configured to collimate or conform received light in only a single plane. More preferably, the (input) wavefront shaping device is configured such that the single plane passes through the cylinder axis of the cylindrical waveguide. For example, the wavefront shaping device may be cylindrical. In preferred embodiments, the wavefront shaping device comprises a planoconvex lens and/or a multi-element lens. Beneficially, the orientation of the wavefront shaping device is orthogonal compared with the orientation of the cylindrical waveguide.

Further generalised features will be discussed again below. Additional specific examples according to the disclosure are now described.

Figure 6:
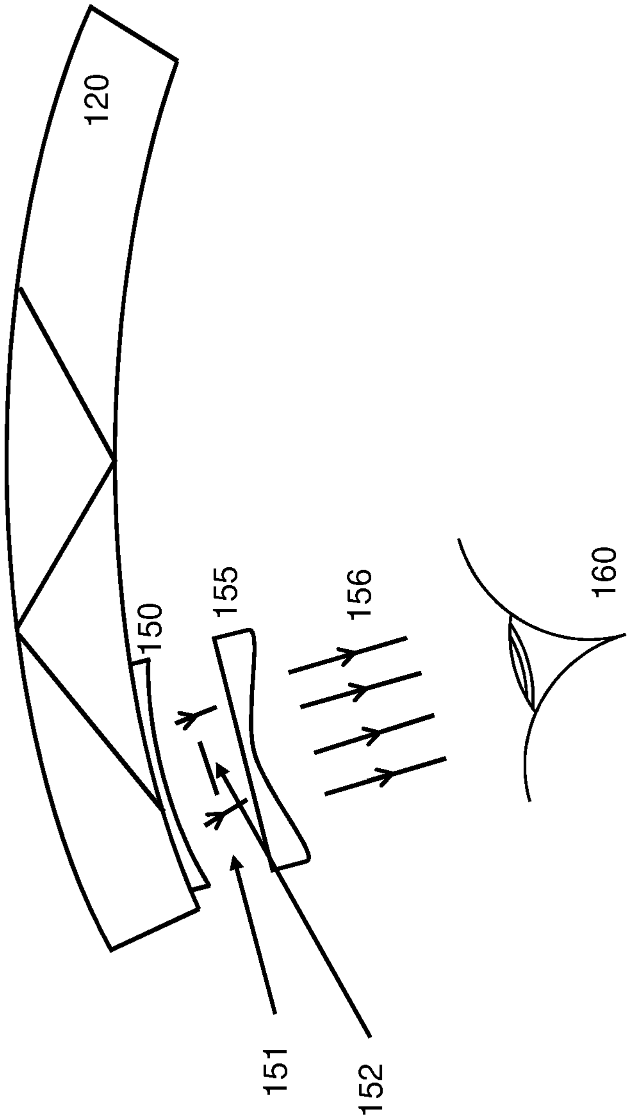
FIG. 6 depicts a schematic top down view of a cylindrical waveguide and a simplification of the out-coupling optics for use with an embodiment of the disclosure.

With reference to FIG. 6, there is depicted a schematic top down view of the cylindrical waveguide 120 and a simplification of the out-coupling optics, including out-coupling diffraction grating 150. As with FIG. 4, the plane of the page (and any parallel plane) in this drawing is considered horizontal and the perpendicular plane coming out of the page (and any parallel plane) is considered vertical. The cylindrical waveguide 120 can therefore be visualised, for example, like a cylindrically shaped visor on a flat surface. Also shown in this simplification is a cylindrical negative lens 155, as will be discussed further below. Rays 151 output from the out-coupling diffraction grating 150 are collimated in a vertical plane and focused in a horizontal plane, as indicated by line 152. Rays 156 output from the cylindrical negative lens 155 are collimated in both the horizontal plane and the vertical plane and have infinite focus. This is a simplification, as the cylindrical negative lens 155 is actually optically integrated within the out-coupling diffraction grating 150. The power is thereby contained in the hologram within the out-coupler to compensate and achieve collimation in both planes at the output. The out-coupling diffraction grating 150 thereby functions as a cylindrical lens to compensate for the cylindrical curvature introduced by the in-coupling optics and, in this way, essentially collimates the image at infinity, as is explained below.

Due to the asymmetrical collimation at the in-coupling optics, the out-coupling optics compensate for the different focal positions of the horizontal (near) and vertical (far or infinity) output image planes to provide an image focused at infinity in both planes, thereby providing a high quality image to the viewer. The compensation is achieved by encoding optical power into the output grating. This approach is known in the art, but not for this purpose. As shown in FIG. 6, it is the equivalent of placing a diverging cylindrical lens 155 with negative power equal to the radius of curvature of the waveguide between a planar output grating and the user (a planoconcave cylindrical lens; if the radius of curvature of the waveguide was 200 mm then the focal length of the lens would be −200 mm). The lens 155 is oriented perpendicular to the input cylindrical lens 135. If the input lens 135 focused (or has power) in a vertical plane the output compensating lens/grating will focus (or has power) in a horizontal plane to create a spherically collimated output. As discussed above, the centre of the out-coupling grating 150 has the same surface pitch (also known as lateral or in-plane pitch) as the input grating to allow for chromatic dispersion compensation.

The image appears to the user 160 at infinity. This is typically the desired use case, as it means that the virtual image will appear in focus when the user is focused on far objects in the real world, as is typical when using a visor, for example, a fighter pilot or motorbike rider. Consumer devices that use planar waveguides with pupil expansion also have the image at infinity.

The output grating can have a varying diffraction grating efficiency, or a relatively low output efficiency (for example, 10%). This can be achieved during recording of the holographic out-coupler. While it is desirable for the input grating 140 to have maximum diffraction efficiency (meaning that the majority of light incident on it is in-coupled into the waveguide), the output grating 150 can have a low or variable efficiency, allowing for pupil expansion. A small fraction of the light is out-coupled at the first interaction with the output grating 150, while a large fraction carries on bouncing down the waveguide and a part of that light is output at the second interaction and so on. This allows for an expanded eyebox in a horizontal plane.

The holographic waveguide grating (either linear out-coupler or powered out-coupler) can be fabricated by exposing a holographic material to two coherent light beams, with the waveguided beam coupled into the material via a prism, as is known in the art. Lasers of three different wavelengths (for example, red, green and blue, RGB) can be used to multiplex three gratings into a single holographic layer to allow a substantially white image to be seen by the viewer from an RGB micro-display. Alternatively, three separate layers can be stacked, one for each colour.

The FOV provided to the user, across which a uniformly bright, chromatically uniformly image can be seen, can be increased by multiplexing multiple gratings into a single holographic layer. This may be achieved by varying the recording angles. Alternatively, multiple angularly multiplexed layers can be stacked.

The input and output gratings can be reflection holograms, transmission holograms or any combination thereof. This will be appreciated from the theory above, as the desired effect is only based on the lateral component of the grating pitch. The transverse (cross-sectional) pitch or period can be chosen conveniently to suit reflection or transmission grating geometry. It can also be appreciated that the above-mentioned linear grating means linear in the lateral direction, but can have variable transverse properties.

The collimated nature of the output light means a large eye relief (that is, distance the eye can be behind the output surface and optimally see the image) can be achieved. This is often desirable, especially for applications with helmet visors rather than glasses. The greater the eye relief, typically the smaller the FOV.

The real world view will be largely unchanged by the curve of the waveguide. A radius of curvature of 250 mm is normal for glasses, and 150-200 mm for a visor. Any curvature greater than 100 mm (as is the case here) will not be noticed by the user as an effect on distorting the real world. There will be only a very small astigmatism effect, unless compensated by an additional overlaid lens (or lenses).

Returning to generalised senses of the disclosure, the out-coupling optics may be considered to comprise an out-coupling diffraction grating. In particular, the out-coupling diffraction grating may be configured to act as a cylindrical lens (for example, focusing in only one dimension). Additionally or alternatively, the out-coupling linear diffraction grating may have curved gratings. In preferred embodiments, the out-coupling linear diffraction grating may have internal grating angles arranged to collimate received light in a plane or to focus received light in tangential and sagittal planes at a predetermined distance and/or an output or diffraction efficiency at an end of the out-coupling diffraction grating nearest light received from the input optics of no more than 25% (optionally, 20%, 15% or 10%).

The out-coupling optics may comprise an output wavefront shaping device configured to collimate received light in a single plane that is orthogonal to the single plane of the input wavefront shaping device. Additionally or alternatively, the out-coupling optics may comprises a cylindrical negative lens. Preferably, such aspects are integrated in the out-coupling diffraction grating.

The out-coupling linear diffraction grating may have the same surface pitch as the in-coupling linear diffraction grating. In some embodiments, the out-coupling linear diffraction may have internal grating angles that are oppositely orientated in comparison with internal grating angles of the in-coupling linear diffraction grating. This is particularly used where the light from the image source and the light to the viewer (or the in-coupling optics and the out-coupling optics) are on the same side as each other. This may be termed a 'U' grating. Alternatively, the angles of the in-coupling grating and out-coupling grating are not oppositely oriented, at least some light will be out-coupled on the opposite side to the in-coupled light (in other words, the viewer would be on the other side compared with the in-coupled light). This may be termed a 'Z' grating.

From an alternative perspective, it is also possible to explain the approaches according to the present disclosure in terms of symmetry. The approaches use a cylindrical waveguide and a cylindrically symmetric wavefront, both rotationally symmetric around their common axis.

Consider a pixel on a display or other image generating means. It is possible to shape the light wavefront from this pixel to be a cylinder. A linear diffraction grating recorded on flat substrate and laminated onto a cylindrical waveguide will have a constant period along the surface. Then, every ray will be deflected by the same angle, resulting in the light field being symmetric around the rotation axis. As explained above, a ray launched between cylindrical surfaces will preserve the two angles of incidence onto the two surfaces at any number of bounces. This means that, after every two reflections, the wave will coincide with itself exactly. No double image is thereby generated. Such a light-field can propagate any distance without any ray becoming different from other rays.

Also, pupil replication at the output grating is achieved. Partial out-coupling of the light happens at an initial interaction with the out-coupling optics, leaving the remaining light to propagate and couple out at the next interaction. In this case, different interactions perfectly match without causing ghost images. When all the rays arrive at the out-coupling grating, the grating can diffract them out of the waveguide no matter the position of the grating or position of any one ray, because they will all arrive alike.

Using a linear out-coupling grating with the same period as that of the in-coupling grating diffracts the rays again into a new cylindrical wavefront. It is well known that diffractive optical elements can combine several functions in additive manner. The out-coupling grating also has a focussing power in one dimension, like that of a cylindrical lens. This will convert diffracted light into a collimated light. An observer receiving such light will experience a star-like point at infinity.

The above explanation can be repeated for other pixels. As identified above, the wavefronts from these other pixels need not be precisely cylindrical. This occurs because rays from non-central pixels are incident on the in-coupling optics at a slightly different angle than the 'perfect' normal (perpendicular) angle. However, by all hitting the in-coupler at substantially the same angle with respect to the surface normal at their respective points of intersection, the resulting rays will form a field of rays rotationally symmetric around the cylindrical axis and propagate in an undistinguishable manner.

Using modern optical design it is possible to design projectors forming such light fields with small error, ideally 1 arc minute (human acuity).

Figure 7:
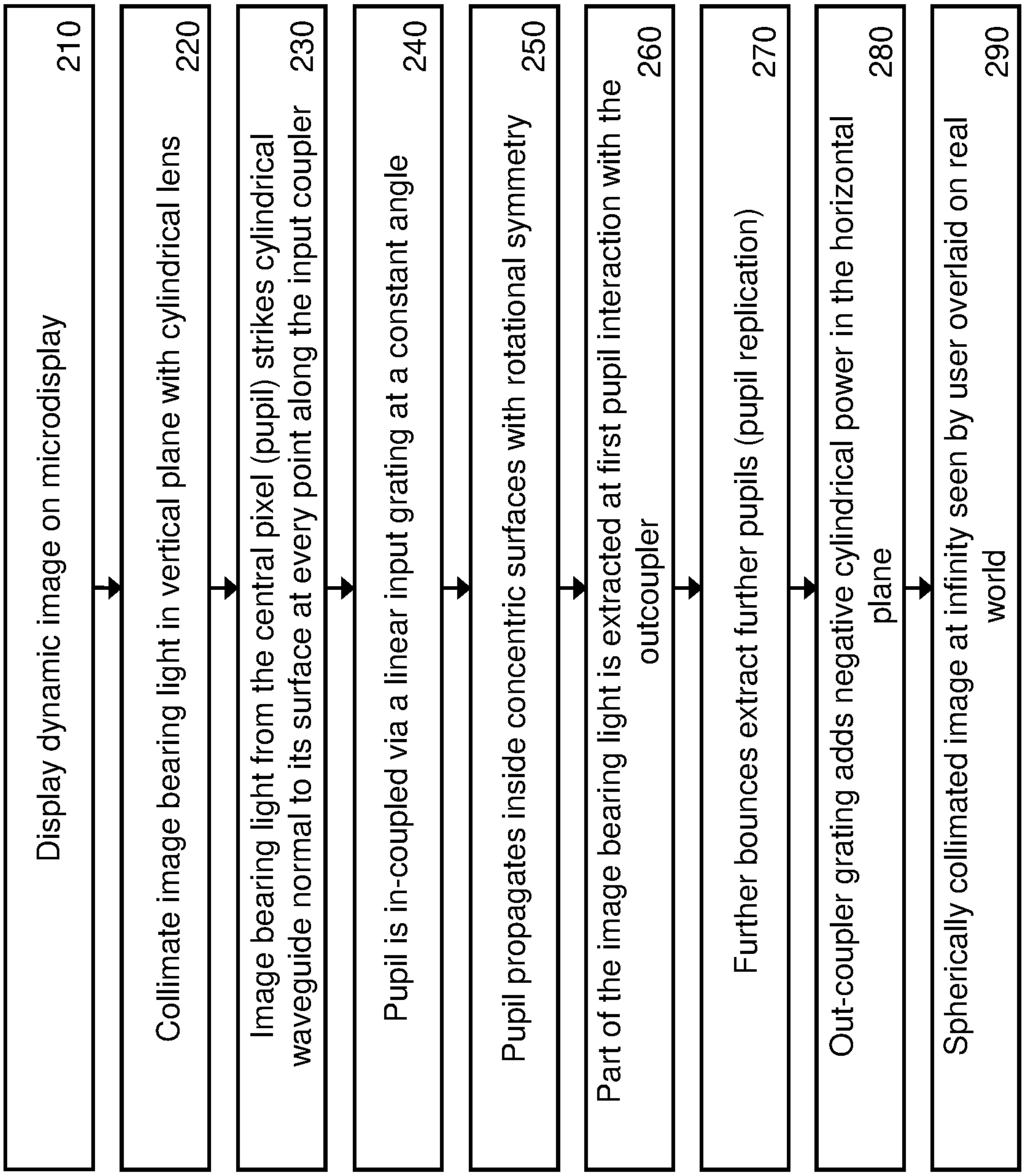
FIG. 7 illustrates an example flowchart for an operational process in accordance with the disclosure.

With reference to FIG. 7, there is illustrated an example flowchart for an operational process for embodiments according to the disclosure. In display step 210, a dynamic image is displayed on the image source 110 (for example, a micro-display). In first collimation step 220, the image-bearing light is collimated in a vertical plane by cylindrical lens 135 (or equivalently, a cylindrical mirror as will be discussed below) with power in a vertical plane. In first incidence step 230, the image-bearing light (for a single pupil) strikes the cylindrical waveguide 120 normal to its surface (typically, inner surface). In in-coupling step 240, the image-bearing light is in-coupled at a constant angle (for all rays from the same pixel) via the linear diffraction grating

140. Since the cylindrical waveguide 120 has concentric inner and outer surfaces, the in-coupled light propagates between the concentric surfaces with rotational symmetry, in propagation step 250. In initial out-coupling step 260, a first part of the image-bearing light is extracted at an initial interaction with the out-coupling diffraction grating 150. Then, subsequent interactions with the out-coupling diffraction grating 150 (bounces) cause further extraction of propagated light, in further out-coupling step 270, thereby providing pupil replication. The optical effect of the out-coupling diffraction grating 150 in second collimation step 280 adds negative cylindrical power in a horizontal plane. Finally, the spherically collimated image at infinity is seen by the eye 160 of a user overlaid on the real world in output step 290.

Although specific embodiments have now been described, the skilled person will appreciate that various modifications and alternations are possible. In particular, the in-coupling and out-couplings optics may differ significantly from the specific design described above.

As shown above, the light source can be placed closest to the inner surface of the cylindrical waveguide and a cylindrical lens can be used to collimate the light. A cylindrical lens need not be used. For example, a cylindrical mirror may be used instead and would potentially have all of the same properties and benefits. The light source equally can be placed past the outer surface and a cylindrical mirror used to collimate the light, for example after it passes through the waveguide.

Many designs can be used to optimise the performance for all pixels and to minimise the volume of the projector. This includes utilising optics with focussing in a vertical plane to bring the display closer. For instance, concave mirrors may be used with light approaching the waveguide from the opposite side than the mirror, before being reflected and then diffracted. This is analogous to the aberration management of afocal systems in classical optics. However, the treatment of these aberrations is reformulated in the present disclosure to the cylindrical coordinate system.

Figure 8:
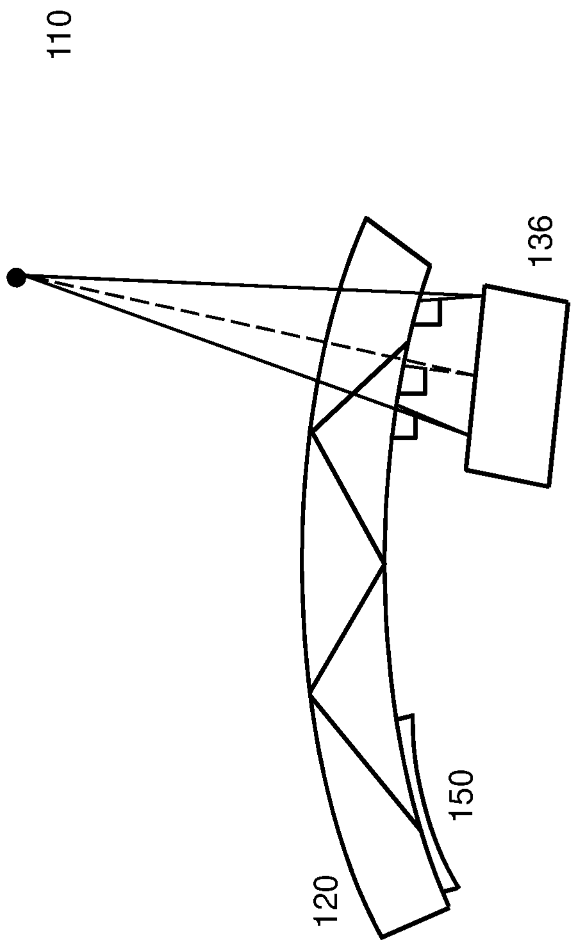
FIG. 8 depicts a schematic top down view of an optical system in accordance with a second embodiment of the disclosure.

With reference to FIG. 8, there is depicted a schematic top down view of an optical system in accordance with a second embodiment. In this embodiment, the cylindrical lens 135 is replaced by a cylindrical mirror 136. Using such a mirror, it is not necessary for the image source 110 to be located nearer to the inner surface of the cylindrical waveguide 120. For simplicity, the input diffraction grating 140 is not shown, but it is present in the same location as in the other embodiments depicted. In the embodiment shown, the image source 110 is located closer to the outer surface of the cylindrical waveguide 120 than to the inner surface of the cylindrical waveguide 120. The optical path length from the image source 110 to the input diffraction grating is kept the same as the radius of curvature of the cylindrical waveguide 120. For example, a typical radius of curvature of a visor-shaped waveguide of 200 mm would mean the object was 200 mm away and the cylindrical mirror had a radius of curvature of 400 mm. However, the distance between the image source 110 and the input diffraction grating is not the same as this radius. It is again seen that the incident rays are normal to the surface of the input grating. The cylindrical mirror 136 effects a wavefront that is essentially the same as effected by the cylindrical lens 135 and therefore has analogous properties. All other variations and options may be applied to implementations in accordance with this embodiment as for other embodiments disclosed herein.

The orientation of the cylindrical waveguide can be varied. The embodiments described above oriented the cylinder axis of the cylindrical waveguide vertically (and the cylindrical waveguide therefore extends in the horizontal direction), as it is the normal way of aligning visors. This is not necessary, however. Other orientations can be considered. Additionally or alternatively, light may enter and exit the cylindrical waveguide through different surfaces, for example on different sides of the waveguide. The in-coupling grating and out-coupling grating can be positioned accordingly to achieve this. More than one in-coupling grating and/or out-coupling grating may be provided in some embodiments.

The in-coupling and out-coupling gratings can each be a reflection or transmission grating, and can be placed on the inner or outer surface of the waveguide (or another surface of the waveguide). The skilled person will understand such variations to the embodiments shown herein.

The linear input grating can have any angle of orientation. The light need not be redirected in the cylinder circumferential direction (perpendicular to the cylinder axis, which is horizontal in the embodiments described above). It can be directed along the cylinder axis (vertical). Alternatively, it can be directed at 45 degrees or any other diagonal direction. This allows design freedom, for instance to position the projection module conveniently at the temple of glasses (eyeglasses). This is also significant for realisation of intermediate gratings for 2D pupil expansion. An intermediate linear grating may redirect and/or split the light, whilst keeping respective angles for each of the redirected rays the same for rays from the same pixel.

The system allows for either laser or LED light to be used, which allows flexibility. Typically, LED light is used, for example a LCOS (Liquid Crystal on Silicon) plus LED or a microLED micro-display, but laser light can also be used if high efficiencies and hence high brightness are desired. A laser beam mirror scanning system (MEMS, micro-opto electro-mechanical system) can also be used. Laser light has some disadvantages in terms of cost, speckle (a loss of resolution) and eye safety concerns.

If a refractive element (for example, a prism) is used as the in-coupler or out-coupler along with a diffractive in-coupler or out-coupler, then the uncompensated chromatic dispersion may be such that only a narrow band source can be used (for example, a laser). Additionally, refractive couplers tend to be bulky and expensive.

It is possible to set the virtual image at different focal distances by adding spherical optical power to the waveguide output. It is also possible to set the focal distance closer with an extra pair of lenses before and after the waveguide (second lens to compensate for the effect of the first lens on the real world). A further possibility is to add electrically addressable switchable (liquid crystal based) holographic output gratings, which can be switched on or off to provide different focal planes for the image. Additionally or alternatively, the input grating may be switched in the same way to provide a larger FOV, as can be achieved with angularly multiplexed gratings. The switching can be synchronised with a time-multiplexed microdisplay.

Optionally, multiple focal planes may be realised by using multiple (stacked) cylindrical waveguides. Light would propagate as discussed above but exit with gratings producing different foci. This approach is as detailed in "Optical architectures for augmented, virtual and mixed reality headsets" (2020), B. C. Kress, SPIE press.

Further adding to the output of the cylindrical waveguide an axially symmetric power, like that of an ordinary spherical lens, will result in experiencing the point at a finite distance, say 1 m.

The cylindrical waveguide may form part of a larger (integral) waveguide structure, only part of which may be cylindrical. Embodiments can be considered in which in-coupling optics are not required. For example, light may enter the waveguide through or originate in the waveguide at (for example, due to an embedded image source) a portion of the waveguide that is not cylindrical and the wavefront shaping may be carried out in this portion. This portion of the waveguide may therefore form part of the input optics.

The vertical eyebox can also be expanded by multiple input projectors vertically displaced. Typical approaches used to extend the vertical eyebox in planar waveguides use 'turn' gratings which propagate the pupil vertically to give 2D exit pupil expansion. There are various methods to expand the eyebox vertically, including an input, turn and output grating such as implemented in products by Vuzix Corporation or DigiLens Inc. An alternative is to use a 'butterfly' turn grating, which expands the eyebox and also expands the FOV by splitting the FOV into two at the input and recombining at the output (as used by HoloLens® marketed by Microsoft Corporation and described in the book by B. C. Kress referenced above). A further option is to use a reciprocal multiplexed grating, which waveguides part of the light and out-couples part of the light across an expanded eyebox (as used in products by WaveOptics, Ltd).

All these existing techniques benefit from the use of collimated light routed by linear gratings and a flat waveguide. According to the present disclosure, which uses a cylindrical waveguide, these techniques of splitting the light and replicating the pupil by intermediate linear gratings may be implemented after the in-coupling of the light into the cylindrical waveguide. Then, the light may be finally out-coupled with the grating having a negative cylindrical focussing function.

The rotationally symmetrical structure of embodiments in accordance with the disclosure allows the input grating and output grating to be placed anywhere on a concentric cylindrical waveguide. For example, as well as the typical planar horizontal configuration discussed above, the orientation could be vertical or at angle across the waveguide (for example, in a visor implementation). This allows for flexibility in placement of the projector and eyebox location in the final design. It also allows for pupil replication and vertical eyebox expansion methods discussed in the previous paragraphs.

Eye tracking is an existing technique that may add extra functionality to AR devices. This is typically achieved with an infrared (IR) light source illuminating the eye and a camera to detect the reflected light and determine the gaze direction of the eye. In space-limited areas (for example visors or glasses), this may not be possible. Adding compact eye tracking functionality to the waveguide may be achieved with input and output gratings as described above, but which diffract infrared light (for example 850 nm). The grating could either simply direct IR light onto the eye, or IR light reflected off the eye could be coupled via TIR from the grating at the eyebox location to an output grating and hence to a camera.

Further reference is made to the generalised senses of the disclosure discussed above. For example in preferred embodiments, a radius of curvature for the cylindrical waveguide is at least 100 mm.

In embodiments, the wavefront shaping device may comprise a concave (cylindrical) mirror. Optionally, the image source and/or an image source mounting may be located closer to the outer surface of the cylindrical waveguide than the inner surface of the cylindrical waveguide. Then, a mirror (which is preferably the wavefront shaping device) may be arranged to receive light from the image source and reflect the received light towards the cylindrical waveguide. In some embodiments, the mirror and the image source and/or image source mounting are configured such that light from the image source passes through the cylindrical waveguide before reaching the mirror. In certain embodiments, respective parts of the input optics proximal the cylindrical waveguide (for example, an in-coupling grating) and out-coupling optics proximal the cylindrical waveguide (for example, an out-coupling grating) are on opposite sides of the cylindrical waveguide.

In certain embodiments, the input optics further comprises one or more spherical lenses. Additionally or alternatively, the out-coupling optics further comprises one or more spherical lenses. A spherical lens may be used to change the optical path length of the light and/or to change the focusing of the light.

In embodiments, the input optics may further comprise a waveguide portion that is integral with the cylindrical waveguide. Beneficially, the waveguide portion forming at least part of the input optics is non-cylindrical and/or does not have concentric surfaces. Only part of the waveguide shape may be cylindrical in some embodiments.

One or more intermediate optical gratings may be provided in the cylindrical waveguide in some embodiments. One, some or all of the one or more intermediate optical gratings may be linear. The intermediate optical grating or gratings may be arranged to redirect, diffract and/or split light before the out-coupling optics. The relative angles of the light rays from the same pixel are advantageously kept the same, however. The intermediate optical linear grating advantageously preserves the angular properties of the propagating light (TIR condition and that all rays from the same pixel are incident on the cylindrical waveguide surface at the same angle relative to the surface normal and at the same angle relative to a plane normal to the cylinder axis), thereby allowing for two-dimensional pupil expansion without aberration.

The out-coupling optics may comprise an out-coupling diffraction grating having one or more of: internal grating angles arranged to refract received light; a variable diffraction efficiency along a length of the out-coupling diffraction grating; and a switchable diffraction grating configuration (for instance, allowing modulation of the output light). Optionally, the in-coupling diffraction grating may have a switchable diffraction grating configuration.

Multiple cylindrical waveguides may be provided. For instance a second cylindrical waveguide, having concentric inner and outer surfaces may be provided. The first and second (or multiple) cylindrical waveguides may be stacked. Some or all of the multiple cylindrical waveguides may have a common cylinder axis. In all such cases, the input optics may be arranged to cause some of the received light to enter each of the multiple cylindrical waveguides, such that for each cylindrical waveguide, all rays originating from the same pixel of the image source are incident on a surface of the respective cylindrical waveguide at the same angle relative to the surface normal and at the same angle relative to a plane normal to the respective cylinder axis, at each point of incidence, the in-coupled light thereby retaining its direction angle as it propagates along the respective cylindrical waveguide. Beneficially, out-coupling optics may be arranged to focus light propagated along each of the cylindrical waveguide at different foci. For instance, the out-coupling optics may be arranged to focus light propagated along the first cylindrical waveguide at a first focus and to focus light propagated along the second cylindrical waveguide at a second, different focus.

Embodiments may be considered with multiple image sources, which are advantageously vertically displaced from one another.

All of the features disclosed herein may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

The invention claimed is:

1. An optical system, comprising:

a cylindrical waveguide, having concentric inner and outer surfaces defining a common cylinder axis;

input optics, arranged to receive light from an image source and to cause the light to enter the cylindrical waveguide so that all rays originating from the same pixel of the image source are incident on a surface of the cylindrical waveguide at the same angle relative to the surface normal and at the same angle relative to a plane normal to the cylinder axis, at each point of incidence, the in-coupled light thereby retaining its direction angle as it propagates in a direction around the common cylinder axis along the cylindrical waveguide, wherein the input optics comprise a wavefront shaping device configured to collimate received light in only a single plane, and wherein the wavefront shaping device is configured so that the single plane passes through the cylinder axis of the cylindrical waveguide.

2. The optical system of claim 1, wherein the input optics comprises in-coupling optics, configured to couple the light into a surface of the cylindrical waveguide.

3. The optical system of claim 2, wherein the in-coupling optics comprise an in-coupling linear diffraction grating, having a constant period, applied to a curved surface and arranged to couple received light into the cylindrical waveguide.

4. The optical system of claim 3, wherein the in-coupling linear diffraction grating is made from a flexible holographic material and/or wherein the in-coupling linear diffraction grating is attached to the inner or outer surface of the cylindrical waveguide and/or wherein the in-coupling linear diffraction grating is switchable.

5. The optical system of claim 3, wherein one or more of:

a grating thickness and an angular bandwidth of the in-coupling linear diffraction grating are configured for uniform visible-range color transmission across a width of the in-coupling linear diffraction grating;

the in-coupling linear diffraction grating has straight gratings; and the in-coupling linear diffraction grating is configured to redirect and/or split the received light into groups, maintaining the same relative angles of rays within each group.

6. The optical system of claim 1, wherein the wavefront shaping device has a cylindrical shape.

7. The optical system of claim 6, wherein the orientation of the cylindrical shape of the wavefront shaping device is orthogonal compared with the orientation of the cylindrical waveguide.

8. The optical system of claim 1, wherein the wavefront shaping device comprises a multi-element lens or a mirror.

9. The optical system of claim 1, wherein the input optics further comprises a waveguide portion that is integral with the cylindrical waveguide.

10. The optical system of claim 1, wherein the input optics is configured to set the angle of all rays originating from the same pixel of the image source incident on a surface of the cylindrical waveguide, relative to a plane normal to the cylinder axis, such that the rays propagate through the cylindrical waveguide in a direction that is parallel to the cylinder axis or a direction that is perpendicular to the cylinder axis or a direction defined by a vector that is between parallel and perpendicular to the cylinder axis.

11. The optical system of claim 1, further comprising the image source and/or an image source mounting, defining a location for a central pixel of the image source and wherein an optical path length between the location for the central pixel of the image source and the cylindrical waveguide is substantially the same as a radius of curvature of the cylindrical waveguide.

12. The optical system of claim 1, further comprising:

the image source and/or an image source mounting, located closer to the outer surface of the cylindrical waveguide than the inner surface of the cylindrical waveguide; and a mirror arranged to receive light from the image source and reflect the received light towards the cylindrical waveguide.

13. The optical system of claim 12, wherein the mirror and the image source and/or image source mounting are configured such that light from the image source passes through the cylindrical waveguide before reaching the mirror.

14. The optical system of claim 1, further comprising:

out-coupling optics, arranged to receive light propagated along the cylindrical waveguide and present the light as an image to an object.

15. The optical system of claim 14, wherein the out-coupling optics comprises an out-coupling diffraction grating.

16. The optical system of claim 15, wherein the out-coupling diffraction grating has at least one configuration selected from the group consisting of: a configuration to act as a cylindrical lens, curved gratings, internal grating angles arranged to collimate received light in a plane or to focus received light in tangential and sagittal planes at a predetermined distance, internal grating angles arranged to refract received light, a diffraction efficiency at an end of the out-coupling diffraction grating nearest light received from the input optics of no more than 25%, a variable diffraction efficiency along a length of the out-coupling diffraction grating, and a switchable diffraction grating configuration.

17. The optical system of claim 14, wherein respective parts of the input optics and out-coupling optics proximal the cylindrical waveguide are on opposite sides of the cylindrical waveguide.

18. The optical system of claim 14, further comprising:

an intermediate linear optical grating in the cylindrical waveguide, arranged to do one or more of: redirecting; diffracting; and splitting light before the out-coupling optics, while retaining a property that all rays originating from the same pixel of the image source are incident on a surface of the cylindrical waveguide at the same angle relative to the surface normal and at the same angle relative to a plane normal to the cylinder axis, at each point of incidence.

* * * * *